Dec. 12, 1944.  R. B. WRIGHT  2,364,681
PENDULUM SUPPORT
Filed Aug. 25, 1941

INVENTOR
RUSSELL B. WRIGHT
BY
ATTORNEY

Patented Dec. 12, 1944

2,364,681

UNITED STATES PATENT OFFICE 2,364,681

PENDULUM SUPPORT

Russell B. Wright, Washington, D. C.

Application August 25, 1941, Serial No. 408,235

4 Claims. (Cl. 171—327)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 St. L. 467).

This invention relates to methods and means for supporting and electrically actuating pendulums and particularly to methods and means employing piezo-electric crystals for supporting gravity pendulums.

One object of this invention is to decrease as far as possible the pivotal damping of pendulums.

Another object of this invention is to provide methods and means for generating electrical impulses of constant frequency under control of a swinging pendulum.

A further object of this invention is to provide a pendulum capable of being set into oscillation at its natural frequency piezo-electrically.

Figure 1:
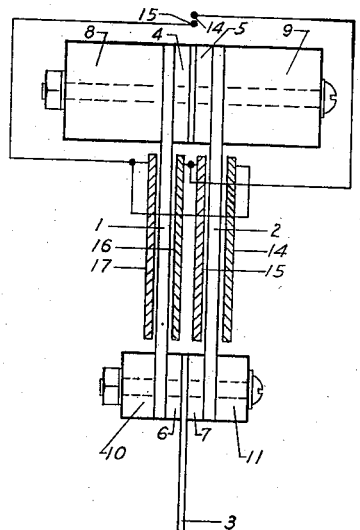
Figure 2:
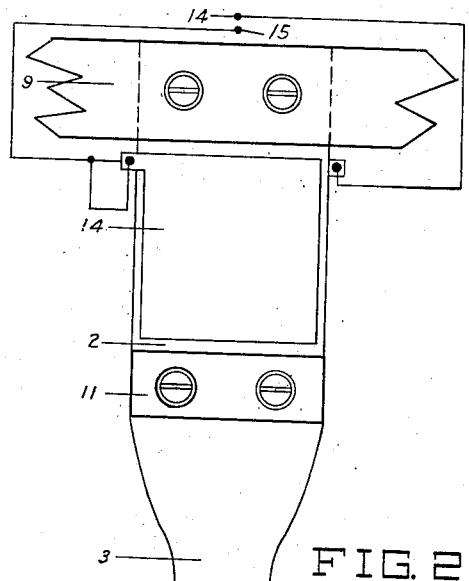
Figure 3:
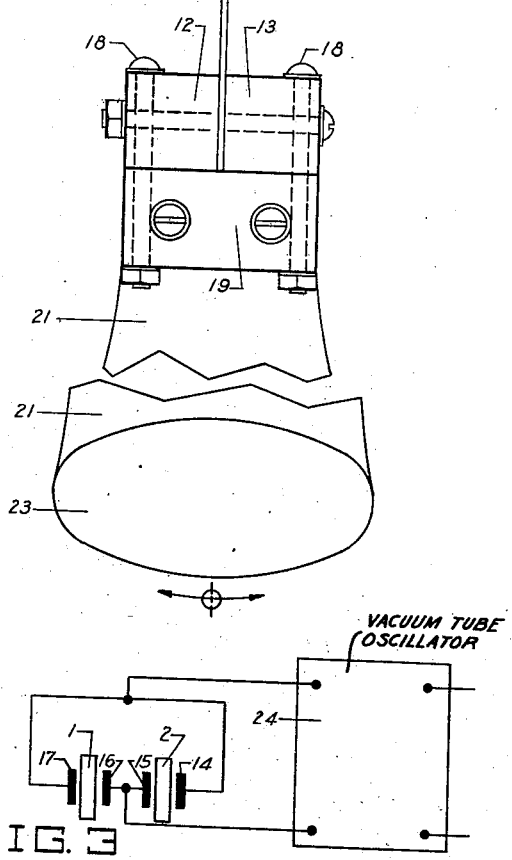

Other and further objects of this invention will be apparent from the detailed description hereinafter when taken in conjunction with the drawing forming a part hereof and in which Figure 1 is a front elevational view partly in section of a preferred embodiment of the invention, showing a pendulum partly foreshortened together with a flexible pivot member and one form of piezo-electric crystal supporting means and electrodes therefor;

Figure 2 is a side elevational view made at right angles to the showing of Figure 1; and Figure 3 is a circuit diagram showing schematically the piezo-electric crystals depicted in Figure 1 with their associated electrodes connected to a vacuum tube oscillator to cause the oscillator to deliver an output frequency controlled in step with the swinging of the pendulum associated with those crystals.

When using a pendulum for the purposes of measuring gravity, or time intervals, for example, the precision obtainable is limited by variations in the pivotal support of the pendulum. This is particularly true where the pendulum is supported on knife-edge pivots, and to a lesser degree where a thin flexible metal member is used, such as shown in the Thompson Patent No. 99,261, granted January 25, 1870.

To lessen or overcome this undesirable feature, the present invention employs a pivotal support for a pendulum comprising a thin flexible ribbon element of quartz which bends to allow the pendulum to swing. This ribbon is made as thin as possible consistent with the weight it is called upon to carry and it is elongated to provide a bendable portion of sufficient length to provide maximum displacement of the pendulum without exceeding the maximum allowable stress therein. In the preferred embodiment this ribbon is made of crystalline or fused quartz, although any material having small elastic hysteresis may be substituted for the quartz. With a small elastic hysteresis the pendulum will have a low damping action. With this construction the precision obtainable is markedly increased over a knife-edge supported pendulum where erratic, variable frictional forces are inevitable. The precision is also increased over spring-leaf supported pendulums of known types employing metal spring supports having high elastic hysteresis. These difficulties may be overcome by making the thin supporting member of quartz or some other material having small elastic hysteresis.

In addition to the above noted advantages, the present invention provides a pendulum driving or pendulum driven arrangement in which the interconnection between the pendulum proper and the associated apparatus is electrical through the intervention of piezo-electric crystals, whereby the pendulum may be utilized to control the frequency of oscillation of a vacuum tube oscillator of the crystal controlled type. Certain crystals, such as quartz, possess the property of developing an electric charge when they are put under pressure or otherwise stressed, and vice versa; that is, they change in dimensions and shape under the action of the electrostatic field. Consequently the frequency of oscillation of a vacuum tube oscillator may be controlled by the mechanical stressing of a quartz crystal. Crystal oscillators are well known in the field of radio where frequencies of thousands of cycles per second are generated. In the oscillators of the prior art as exemplified in the United States patents of G. W. Pierce, the frequency of oscillation is determined almost solely by the size, shape and physical characteristics of the crystal itself. In the present invention the effective length of the pendulum determines the frequency at which the piezo-electric crystal is to be stressed.

In the drawing, members 1 and 2 are piezo-electric, being made of crystalline quartz, while the thin flexible member 3 is either crystalline or fused quartz. The piezo-electric members 1 and 2 are rigidly supported at their upper ends and spaced apart by spacers, such as 4 and 5. At their lower ends the piezo-electric members 1 and 2 are spaced apart by spacers 6 and 7 and by the thin flexible member 3. The upper ends of the crystal members 1 and 2, together with the spacers 4 and 5, are firmly clamped between members 8 and 9 constituting a part of the pendulum supporting structure. The lower ends of the crystal members 1 and 2 together with the spacers 6 and 7 and the upper end of the thin flexible member 3 are firmly clamped between the clamping members 10 and 11. The lower end of the thin flexible member 3 is firmly clamped between the members 12 and 13, which members form a support for the parts depending therefrom.

Electrodes 14 and 15 are disposed on opposite sides of the crystal member 2 and electrodes 16 and 17 are disposed on opposite sides of the crystal member 1. These electrodes may be formed of metal foil pasted directly on the respective sides of the crystal members or they may be sputtered or evaporated or otherwise deposited thereon, but for the utmost in precision they should be mounted far enough from the piezoelectric elements to prevent physical contact therewith at all times, yet close enough to affect or be affected by the respective crystal members.

Bolts 18 pass through the pair of clamping members 12 and 13 and secure a second pair of clamping members 19 and 20 thereto. The clamping members 19 and 20 tightly engage a thin flexible member 21 at its upper end. The thin flexible member 21 is mounted to permit ready flexure thereof at right angles to the direction of flexure of the thin flexible member 3. At the lower end of the flexible member 21 there is attached a pendant comprising two halves 22 and 23 which are bolted or otherwise clamped together and to the member 21.

The electrodes associated with the piezo-electric members 1 and 2 are connected, as shown in Figure 3, to a vacuum tube oscillator 24 when it is desired to generate electrical impulses controlled by the swing of the pendulum comprising pendant 22, 23, flexible members 21 and 3 and the piezo-electric elements 1 and 2.

In the above described apparatus the piezoelectric elements 1 and 2 are cut from the mother crystal with orientation such as to give longitudinal stress when an electrostatic field is applied in the direction of the thickness dimension. For high precision the orientation should be such as to give the lowest temperature coefficient. With the two elements 1 and 2 oriented similarly, the electrodes 14, 15, 16 and 17 should be connected as shown in Figures 1 and 3, with electrodes 15 and 16 connected together and with electrodes 14 and 17 connected together, in which case an applied electrical potential will cause one element to expand while the other element contracts. With an alternating potential of a frequency corresponding to the natural (driven) frequency of the pendulum, it may be sustained in motion if desired. Conversely, if the pendulum is caused to swing an alternating potential will be produced across the terminals 14 and 15, thus facilitating frequency comparison for measurement.

In the above described embodiments all of the elements constituting the pendulum proper and its supports, with the exception of the piezoelectric elements and the bolts, nuts and washers used in clamping the parts together, should, for precision, be made of fused quartz or some other material having a low coefficient of expansion and small elastic hysteresis.

In operation the pendulum, comprising pendant 22, 23 and members 21 and 3 and piezo-electric elements 1 and 2, swings as shown by the arrows in Figure 1, pivoting in part about the fixed support 8—9 by virtue of the elasticity of piezoelectric elements 1 and 2 and about the members 6—7 by flexure of the member 3. The lower flexible member 21 permits bending thereof to compensate for slight inaccuracies in leveling the supporting members 8 and 9.

The pendulum can be made to swing by the application of electrical potentials of the proper frequency across the piezo-electric element, or electrical potentials can be generated by swinging the pendulum, or the swing of the pendulum may be made to be selfsustaining to control the generation of electrical oscillations of frequencies hitherto found to be far below the range of piezoelectric crystal oscillators.

Other modifications and applications will be apparent to those skilled in the art and all such are considered to fall within the scope and spirit of the invention as defined in the appended claims.

What is claimed is:

1. A precision pendulum comprising a pair of piezo-electric elements mounted in parallel relation and similarly oriented, means for rigidly holding said piezo-electric elements at one end, means clamping the opposite ends of said elements to one end of a thin flexible element suspending a pendulus mass at its opposite end, and means for electrostatically exciting said piezoelectric elements to simultaneously cause lengthening of one element and shortening of the other element, whereby said pendulus mass swings at its natural frequency responsive to the excitation of said piezo-electric elements at said frequency, pivoting partly in said pair of piezo-electric elements and partly in said thin flexible element.

2. A device in accordance with claim 1, in which said thin flexible element is composed of fused quartz.

3. A device for generating electrical impulses at the free swinging periodicity of a pendulum, comprising a pair of spaced piezo-electric elements mounted in parallel relation and rigidly held at one end, a member suspending a pendulous mass clamped to the opposite end of said piezo-electric elements, pairs of electrodes embracing said piezo-electric elements for collecting the charges generated thereacross responsive to the swinging of said pendulum and the consequent stressing of said piezo-electric elements and conductors connecting respective ones of said pairs of electrodes together whereby arithmetical addition of the charges generated across both of said piezo-electric elements is effected.

4. A device in accordance with claim 3, in which the member supporting said pendulous mass is a thin flexible member composed of fused quartz.

RUSSELL B. WRIGHT.